United States Patent [19]
Richardson et al.

[11] 3,919,258
[45] Nov. 11, 1975

[54] IMPROVED PROCESS FOR MAKING POLYMALEIC ANHYDRIDE

[75] Inventors: Norman Richardson, Middleton; Thomas Ivor Jones, Poynton; Peter Miles, Stockport, all of England

[73] Assignee: Ciba-Geigy (UK) Limited, London, England

[22] Filed: Feb. 14, 1974

[21] Appl. No.: 442,548

[30] Foreign Application Priority Data
Feb. 14, 1973 United Kingdom............... 7182/73
May 9, 1973 United Kingdom............... 22109/73

[52] U.S. Cl......................................... 260/346.8 R
[51] Int. Cl.².......................................... C07D 307/46

[58] Field of Search................................. 260/346.8

[56] References Cited
FOREIGN PATENTS OR APPLICATIONS
1,063,036   3/1967   United Kingdom........ 260/346.8 R

*Primary Examiner*—Harry I. Moatz
*Attorney, Agent, or Firm*—Luther A. R. Hall

[57] ABSTRACT

A process for the manufacture of polymaleic anhydride which comprises polymerising maleic anhydride in xylene as solvent, the ortho-isomer content of the xylene being up to 99%, and using di-tertiary butyl peroxide as polymerisation catalyst to give good yields and liquid products which can be easily separated.

4 Claims, No Drawings

IMPROVED PROCESS FOR MAKING POLYMALEIC ANHYDRIDE

The present invention relates to the polymerisation of maleic anhydride.

It is known that maleic anhydride can be polymerised to give polymers of varying molecular weights, several methods of polymerisation having been described in the literature.

British Patent Specification No. 1,193,146 describes the production of polymaleic anhydride by treating maleic anhydride at 70° to 120°C. for at least 3 hours using toluene as solvent and 0.02 to 0.2 mol. of benzoyl peroxide as polymerisation initiator per mol. of the fed maleic anhydride. Various solvents were examined, but toluene was found to be the best in terms of yield obtained. For example, using toluene a yield of 104% was obtained, whereas under the same conditions, but using xylene as solvent, the yield was only 41%. A serious disadvantage of such a process is that the resulting polymer was produced as a black tar which adhered to the sides of the reaction vessel and caused serious problems when operated on a plant scale due to difficulties in stirring the tarry polymer.

British Patent Specification No. 1,024,725 describes the production of polymaleic anhydride using an inert organic solvent and a free radical polymerisation catalyst. The inert organic solvents used are ones which do not react with maleic anhydride under the polymerisation conditions used.

We have now surprisingly found that when xylene of ortho-isomer content up to 99% is used as solvent, xylene being a reactive solvent, and di-tertiary butyl peroxide is used as catalyst, the polymaleic anhydride is obtained in good yields and in a liquid form which makes it easy to separate from the reaction mixture.

Accordingly, the present invention provides a process for the manufacture of polymaleic anhydride which comprises polymerising maleic anhydride in xylene as solvent, the ortho-isomer content of the xylene being up to 99%, and using di-tertiary butyl peroxide as polymerisation catalyst.

The xylene may be a commercial xylene, the ortho-isomer content of which is ≯ 70%. We prefer to use xylene having an ortho-isomer content of from 1 to 25%. The proportion of meta- and para-isomers is not critical.

When using the process of the present invention we find that the polymer separates from the reaction medium as a pale brown oil which is mobile at temperatures above 65°C. enabling it to be easily isolated. In some cases the polymer is mobile at temperatures below 65°C., for example at temperatures above 50°C. or 55°C., but they are all mobile at temperatures above 65°C.

The ratio of maleic anhydride to the total amount of xylene used in the reaction may range for example from 1:1 to 1:3 by weight preferably from 1:1.3 to 1:2.5 and more preferably from 1:1.5 to 1:2.5 by weight. The amount of di-tertiary butyl peroxide polymerisation initiator may be for example from 15 to 40% by weight based on the fed maleic anhydride although the preferred amount is from 20 to 35% by weight. The polymerisation initiator may be added slowly over a period of time, e.g. up to 2.5 hours, preferably in a mixture with a proportion of the xylene solvent used for the reaction.

The polymerisation reaction may be carried out at an elevated temperature of, for example 120°C. to 145°C. preferably from 130°C. to 145°C. Reaction times can vary over a wide range, but times of from 4 to 7 hours, preferably from 5 to 6 hours have been found to be particularly suitable.

The polymer which is obtained by the process of the present invention has a molecular weight in the range of from 300 to 1000 when measured in a dioxane or 2-butanone solution by a vapour pressure osmometer.

Since the polymer is obtained in the form of a mobile oil at temperatures above 65°C. it may be easily separated from the reaction medium by a decanting process or by using a vessel having a valve in the bottom through which it may be allowed to run off. Preferably the separation is carried out at temperatures of from 60°C. to 90°C. The resulting polymer is relatively uncontaminated by unreacted maleic anhydride. The maleic anhydride and mixed isomers of 3-tolyl-1,2-propane dicarboxylic anhydride, which are byproducts of the reaction, remain in solution in the xylene layer.

A typical thin layer chromatography analysis of an unpurified polymer which had been hydrolysed with water showed that the polymer contained 2% maleic anhydride and 1% mixed isomers of 3-tolyl-1,2-propane dicarboxylic anhydride.

The polymer may be isolated as the anhydride or it may be hydrolysed to the corresponding polycarboxylic acid.

Polymaleic anhydride or derivatives thereof are useful for a number of important purposes. For example, polymaleic acid and especially the water soluble salts thereof exhibit threshold and crystal modifying effects which can be utilised in the control of scale, such as that which, for example, forms in boilers, evaporators and industrial cooling plants. They also show special utility as chemical intermediates, as additives to other polymer systems and as corrosion inhibitors for metal surfaces, particularly in the presence of zinc salts. They may also be used as detergent builders.

The invention will be illustrated with reference to the following Examples in which parts and percentages are by weight. A typical analysis of the commercial grade xylene used in some of the Examples is as follows:

| | |
|---|---|
| Ethyl benzene | 14.8% |
| o-xylene | 63.5% |
| m/p-xylene | 21.5% |
| with traces of benzene and toluene | |

EXAMPLE 1

100 parts maleic anhydride and
100 parts commercial grade xylene were heated to 120°C.
A solution of
20 parts di-tertiary butyl peroxide in
50 parts commercial grade xylene
were added over a period of 15 minutes. The temperature of the reaction mixture was then raised to 130°C. and maintained there for 5 hours. Both heating and stirring were stopped and the polymer allowed to separate from the xylene. When the temperature of the reaction mixture had dropped to 85°C. the lower polymer layer was separated from the upper xylene layer. 81 Parts (81% yield, based on fed maleic anhydride) of polymer were obtained.

The polymer was further purified by adding 15 parts 2-butanone or dioxane as a diluent. The polymer was precipitated by adding the polymer solution to 500 parts by volume of toluene which was stirred on a high speed homogeniser. After filtration and drying under vacuum at 50°C., 78 parts (78% yield based on fed maleic anhydride) of polymer were obtained as a cream coloured powder.

The polymer obtained above had a molecular weight of 580 when measured in 2-butanone by a vapour pressure osmometer.

When the above Example 1 was repeated, separating the polymer at 70°C. instead of 85°C., the yield was increased to 91%.

When solvents, which contain > 99% ortho-xylene, were used in the process described in Example 1 polymers were obtained which solidified at temperatures > 70°C. When pure ortho-xylene was used as the solvent, a polymer was obtained which was a solid even at a temperature of 120°C.

EXAMPLE 2

300 parts maleic anhydride and
300 parts of commercial xylene were heated to reflux, 142°C.
A solution of
100 parts di-tertiary butyl peroxide in
150 parts commercial xylene was added over a period of 2 hours During this addition the temperature of reflux falls to 132°C.

The mixture was heated for a further 4 hours at reflux and then cooled to 85°C. Stirring was stopped and the polymer allowed to separate. A sample of polymer taken at this stage was found to have a molecular weight of 440 when measured in 2-butanone by a vapour pressure osmometer.

The lower polymer layer was run into 300 parts water at 80°C. and the mixture was stirred at this temperature for one-half hour. During this time the polymer hydrolysed and dissolved.

Steam was then passed through the solution in order to remove traces of xylene present. 612 Parts of a 50% w/w aqueous solution of the polymaleic acids were obtained (= 86.2% yield based on fed maleic anhydride).

Thin layer chromatography showed that the solution contained 2% maleic acid and 1% of the mixed isomers of 3-tolyl-1,2-propane dicarboxylic acid as impurities.

When the above Example 2 was repeated, separating the polymer at 70°C. instead of 85°C., the yield was increased to 96%.

EXAMPLE 3

100 parts of maleic anhydride were dissolved in 100 parts of a solvent mixture having the following composition:-
70% o-xylene
10% m-xylene
10% p-xylene and
10% ethyl benzene by warming the mixture to 120°C. A solution of 20 parts di-tertiary butyl peroxide in 50 parts of a solvent mixture having the composition shown above was then added dropwise over a period of 15 minutes. The temperature of the mixture was raised to 130°C. and maintained at this temperature for 5 hours. The reaction mixture was then cooled to 70°C. the stirring stopped and the lower polymer layer allowed to separate. The polymer was then run off via a run off valve fitted to the base of the reaction vessel.

109 parts of polymer which was mobile at temperatures >50°C. and had a molecular weight of 725, when determined by osmometry in either dioxane or 2-butanone as solvent were obtained.

EXAMPLE 4

When the process described in Example 3 was repeated using a solvent mixture of composition
80% o-xylene
10% ethyl benzene
5% m-xylene
5% p-xylene and
108 parts of polymer were obtained.

In this case the polymer was mobile at temperatures > 60°C. and had a molecular weight of 700.

EXAMPLE 5

When the process described in Example 3 was repeated using a solvent mixture of composition:
85% o-xylene
5% m-xylene
5% p-xylene and
5% ethyl benzene 107 parts of polymer were obtained. The polymer had a molecular weight of 625 and was mobile at temperatures > 64°C.

EXAMPLE 6

When the process described in Example 3 was repeated using a solvent mixture of composition:
90% o-xylene
2.5% m-xylene
2.5% p-xylene
5% ethyl benzene and
106 parts of polymer were obtained. The polymer was mobile at temperatures > 60°C. and had a molecular weight of 625.

EXAMPLE 7

When the process described in Example 3 was repeated using a solvent mixture of composition
90% o-xylene
3.75% m-xylene
3.75% p-xylene and
2.5% ethyl benzene 103 parts of polymer were obtained. The polymer was mobile at temperatures >58°C. and had a molecular weight of 625.

EXAMPLE 8

When the process described in Example 3 was repeated using a solvent mixture of composition
95% o-xylene
1.25% m-xylene
1.25% p-xylene and
2.5% ethyl benzene 102 parts of polymer were obtained. The polymer had a molecular weight of 630 and was mobile at temperatures > 65°C.

EXAMPLE 9

When the process described in Example 3 was repeated using a solvent mixture consisting of:
99% o-xylene
1% m-xylene and 103 parts of polymer were produced which was mobile at temperatures > 55°C. and had a molecular weight of 690.

EXAMPLE 10

When the process described in Example 3 was repeated using a solvent mixture of composition
99% o-xylene and
1% p-xylene
102 parts of polymer were obtained. This polymer was mobile at temperatures > 55°C. and had a molecular weight of 700.

EXAMPLE 11

When the process described in Example 3 was repeated using a solvent mixture of composition:
99% o-xylene and
1% ethyl benzene
104 parts of polymer were obtained which had a molecular weight of 800. The polymer produced in this system was mobile at temperatures > 45°C.

When pure ortho xylene was used as the solvent in the process of Example 3 the polymer, which was obtained in a yield of 118% solidified at 120°C. to a hard friable resin and had a molecular weight of 600.

EXAMPLE 12

100 parts of maleic anhydride were dissolved in 100 parts of a solvent mixture having the following composition:-
6% o-xylene
53% m-xylene
17% p-xylene and
24% ethyl benzene
by warming to 120°C. A solution of 20 parts di-tertiary butyl peroxide in 50 parts of solvent having the composition shown above was added dropwise over a period of 15 minutes. The temperature of the mixture was raised to 130°C. and maintained at this temperature for 5 hours. The reaction mixture was then cooled to 70°C., the stirring stopped and the lower polymer layer allowed to separate. The polymer was run off via a run off valve fitted to the base of the reaction vessel.

113 parts of polymer which was mobile at temperatures > 40°C. and had a molecular weight of 560, when determined by osmometry in either dioxane or 2-butanone as solvent, were obtained.

EXAMPLE 13

When the process described in Example 12 was carried out in a solvent mixture of composition
12% o-xylene
49% m-xylene
9% p-xylene and
30% ethyl benzene
117 parts of polymer were obtained. In this case the polymer was mobile at temperatures > 45°C. and had a molecular weight of 510.

EXAMPLE 14

When the process described in Example 12 was repeated using a solvent mixture of composition
18% o-xylene
44% m-xylene
19% p-xylene and
19% ethyl benzene
115 parts of polymer were obtained. The polymer had a molecular weight of 598 and was mobile at temperatures >40°C.

It can be seen from the yields of polymer quoted in the above Examples that some of the xylene solvent becomes chemically incorporated into the polymer molecule. This observation has been confirmed by nmr analysis of the purified polymer.

We claim:

1. An improved process for manufacturing polymaleic anhydride wherein maleic anhydride dissolved in a weight ratio of 1:1 to 1:3 in xylene solvent containing up to 99% orthoisomer is polymerized using di-tert-butyl peroxide polymerization catalyst, said catalyst being added to the reaction mixture over a period of up to 2.5 hours, wherein the improvement comprises
    using 15 to 40% by weight of di-tert-butyl peroxide catalyst based on the maleic anhydride,
    carrying out the polymerization at a temperature of 120° to 145°C, and
    isolating at a temperature over 65°C essentially pure polymaleic anhydride as a light colored liquid immiscible in the xylene layer which contains unreacted maleic anhydride and reaction byproducts.

2. A process as claimed in claim 1 in which the amount of di-tertiary butyl peroxide is from 20 to 35% by weight based on the maleic anhydride.

3. A process as claimed in claim 1 in which the polymerisation reaction is carried out at a temperature of from 130°C to 145°C.

4. A process as claimed in claim 1 in which the orthoisomer content of the xylene is from 1 to 25%.

* * * * *